(12) United States Patent
Tang

(10) Patent No.: US 7,155,956 B2
(45) Date of Patent: Jan. 2, 2007

(54) MEDIUM, METHOD AND SYSTEM FOR PROVING A TURBINE METER

(75) Inventor: Paul Tang, Surrey (CA)

(73) Assignee: Terasen Gas Inc., Vancouver (CA)

( * ) Notice: Subject to any disclaimer, the term of this patent is extended or adjusted under 35 U.S.C. 154(b) by 133 days.

(21) Appl. No.: 10/762,549

(22) Filed: Jan. 23, 2004

(65) Prior Publication Data

US 2005/0160784 A1    Jul. 28, 2005

(51) Int. Cl.
G01F 25/00 (2006.01)
G01F 1/12 (2006.01)
G01F 1/50 (2006.01)

(52) U.S. Cl. .......................... 73/1.27; 73/1.28; 702/100
(58) Field of Classification Search ................. 73/1.27, 73/1.28, 1.32, 861.79, 861.81; 702/100
See application file for complete search history.

(56) References Cited

U.S. PATENT DOCUMENTS

| 1,579,347 | A | * | 4/1926 | Bullinger | ................... | 338/150 |
| 3,538,741 | A | * | 11/1970 | Ludwin | .................. | 73/1.27 |
| 3,840,051 | A | * | 10/1974 | Akashi et al. | ................ | 138/37 |
| 4,649,734 | A | * | 3/1987 | Hillburn | .................... | 73/1.19 |
| 4,910,519 | A | | 3/1990 | Duell et al. | .................. | 341/157 |
| 4,965,756 | A | | 10/1990 | Pearman et al. | ............ | 702/100 |
| 5,072,416 | A | | 12/1991 | Francisco, Jr. et al. | ..... | 702/100 |
| 5,327,730 | A | | 7/1994 | Myers et al. | .................. | 62/614 |
| 5,386,699 | A | | 2/1995 | Myers et al. | .................. | 62/613 |
| 5,473,932 | A | | 12/1995 | Fitzpatrick et al. | .......... | 73/1.28 |
| 5,866,824 | A | | 2/1999 | Schieber | .................. | 73/861.79 |
| 6,550,327 | B1 | | 4/2003 | Van Berk | .................... | 73/438 |
| 6,732,596 | B1 | * | 5/2004 | Delajoud | .................. | 73/861.61 |

FOREIGN PATENT DOCUMENTS

| CA | 1293568 | 12/1991 |
| CA | 2056929 | 6/1992 |
| CA | 2448275 | 12/2002 |

OTHER PUBLICATIONS

Honchar, Paul G., *Peformance Comparisons of Turbine Meters as Low and High Pressures*, Invensys Metering Systems, DuBois, PA, pp. 1-20.
Jongerius, Peter F. M., et al., *Calibration Facilities For Industrial Gas Flow Meters in The Netherlands*, Flow Meas. Instrum., 1993 vol. 4 No. 2, pp. 77-84.
Measurement Canada, *Bulletin: Recognition of Test Data from Gas Meter Test Facilities*, Bulletin No. G-16-E (rev 2), Dec. 7, 2001, pp. 1-5.
Payne, Ken et al., *Proving by Master Meter Method*, Measurement +Control, vol. 35, Jun. 2002, pp. 146-149.
Schieber, Bill, *Gas Meter Testing: New Test Calibration Facilities For Gas Turbine Meters*, Pipeline & Gas Journal, Jul. 2000, www.undergroundinfo.com, pp. 25-28.

* cited by examiner

Primary Examiner—Hezron Williams
Assistant Examiner—Tamiko Bellamy
(74) Attorney, Agent, or Firm—Fasken Martineau DuMoulin LLP

(57) ABSTRACT

A novel medium, method and system for proving a turbine meter for use with natural gas. The novel test medium is a gas having the following characteristics: (a) Density>2× Density of Natural Gas; (b) Dynamic Viscosity<Dynamic Viscosity of Natural Gas; and (c) Ideal gas behavior for approximately 15° C.<T<25° C. and 1 bar<P<50 bar. The method and system make use of the novel test medium. Also disclosed is a novel method and system for cooling a test medium circulating in a turbine meter prover system involving injecting liquefied test medium into said circulating test medium.

37 Claims, 4 Drawing Sheets

MEDIUM, METHOD AND SYSTEM FOR PROVING A TURBINE METER

FIELD OF THE INVENTION

The present invention relates to a medium, method and system of testing and/or calibration of (also referred to as "proving") a turbine meter in which the test medium is a gas that has a density sufficiently higher than that of natural gas, such as carbon dioxide. The present invention further relates to the use of a test medium as a refrigerant to keep the testing apparatus at an appropriate temperature for testing and/or calibration of a turbine meter.

BACKGROUND OF THE INVENTION

Conventional turbine meters of the type used to measure the flow of gas typically operate by converting kinetic energy of the flowing gas to rotation of a turbine that has its axis parallel to the path of gas flow.

These turbine meters typically include an elongated, cylindrical housing that forms a flow path for gas which is flowing within a pipeline in which the housing is mounted. An inlet flow straightener is mounted adjacent to an inlet port in the housing to cause gas flowing from the inlet port to flow in an axial direction within the housing. A measuring rotor is mounted downstream of the inlet flow straightener so as to rotate about a central axis of the cylindrical housing. The measuring rotor has turbine blades installed on it which cause it to rotate in one direction at a speed approximately proportional to the velocity of the gas flowing through the housing.

The theory of operation of turbine meters must include consideration of the fact that the density of gases varies significantly with pressure or temperature. Additionally, because the density of gases is relatively low, consideration must be given to the driving torque from gas required to overcome mechanical friction in a turbine meter. In particular small changes in retarding torques, for example due to increases in friction between moving parts, may affect the performance of turbine meters, especially at low pressure and low flowrates. Changes in kinematic viscosity may also affect the performance of turbine meters.

The total volume of gas passing through the meter is generally determined by counting the number of revolutions of the measuring rotor mounted within the meter. Because of this, turbine meters are also known as inferential meters, since they infer how much gas or liquid has passed through by observing something else i.e. gas velocity. Therefore, the actual flow-rate of a turbine meter can be inferred from the velocity of the gas when the cross-sectional area of the annular passage preceding the rotor is known.

The driving energy to turn the rotor is the kinetic energy, or energy of motion, of the gas being measured. The gas impinges on rotor blades mounted on the measuring rotor and overcomes retarding forces that inhibit the rotor from turning. Because the density of gas is low, it is generally necessary to reduce the cross-sectional area of the gas pipeline in which a turbine meter is mounted to accelerate the flow of the gas to a higher kinetic energy which allows the gas to be measured by the turbine meter. Often, an inlet flow guide, or flow straightener, serves to reduce the area through which the gas flows to approximately one-half the area of the pipe in which the turbine meter is installed. Reducing the cross-sectional area of the flow path of the gas increases the velocity of the gas proportionately when the gas flow-rate remains constant.

Turbine meters are commonly installed in pipelines used in the natural gas industry for the measurement of the flow of large volumes of gas. The volumes that pass through the pipelines are often so large that small errors in measurement can result in large losses of revenue to gas transmission companies and local distribution companies.

For the above reasons, each turbine meter must be calibrated to determine its accuracy after it is manufactured. Calibration is necessary because normal, minor variations in meter components cause each turbine meter to register a slightly different volumetric flow for a given volume of gas. By way of example, from meter-to-meter, blades on turbine measuring rotors vary slightly in shape due to minor manufacturing inconsistencies. As a result, each turbine measuring rotor rotates at a slightly different speed for gas flowing at the same velocity. Similarly, separate sets of measuring rotor bearings of the same make and model can impose slightly different functional forces on the rotors of separate meters on which they are mounted. Additionally, a turbine meter normally has a mechanical register, sometimes called an index, which gives a reading of gas flow volume on a set of dials. A register is typically connected to a turbine-measuring rotor through a coupling, which includes gears, magnetic couplings and other components which load the turbine rotors of different turbine meter to a somewhat different extent. As a result, each turbine meter will register its own unique flow level for a given volume of gas.

Conventionally, at the time of manufacture of a turbine meter, testing the meter against a known standard such as a master meter, a bell prover or a sonic nozzle proves the accuracy of the meter. Testing and calibration is done at a given temperature, a given gas line pressure and a given gas flow rate, which allows the volume of gas registered by the meter to be compared to the actual volume of gas which flowed through the meter as determined by the standard. This ratio of the volume of gas measured by a meter's mechanical register to the actual volume of gas flowing through the meter is called the accuracy of the meter. The calibration factor of a meter, referred to by the letter "K," is expressed in terms of pulses per unit of volume flowing through a meter and is the amount by which the registered reading of the meter is divided to get a 100% accurate reading. Generally each meter is tested and calibrated based on an air test at atmospheric pressure, the K factors are determined for a range of flow-rates expected for the meter and a table of these K factors may be provided with each meter. A customer may request high-pressure tests, typically at an extra cost.

The accurate testing of a turbine meter after it has been installed is also important because the accuracy of the meter can change over time as a result of factors such as damaged components, increased friction between components due to wear or due to contamination carried by gas flowing through the meter. Thus, there is a need to periodically prove turbine meters over their operating life.

As indicated above, each turbine meter normally has a mechanical mechanism, called a register or an index, which records the volume of gas that has flowed through the meter. The measuring rotor of the meter is coupled through a series of gears, magnetic couplings and the like to a set of dials on the register which indicate the volume of gas that has flowed through the turbine meter. Since only a single set of gears and/or couplings can be installed at one time between the measuring rotor and the dials, the register can only be calibrated to be 100% accurate at one flow-rate, usually about 60% of the maximum flow-rate of the meter.

The accuracy of the volume of gas recorded by the dials of a meters register, however, is checked at the time of a meter's calibration over a range of flow-rates. At any particular line pressure, an accuracy curve is drawn showing the accuracy of the meter as its flow-rate changes. Components of the meter are often modified to attempt to get the accuracy of the meter as consistent as possible over its expected range of flow-rates.

Turbine meters tend to have an undesirable "hump" in their accuracy curve at low flow-rates, signifying that at these flow-rates the register records more gas than has actually flowed through the meter. Generally a meter records less gas than has actually flowed through it below a flow-rate of about 5% of the maximum capacity of the meter. Further, a meter generally records more gas than has actually flowed through it until the meter reaches a flow rate of about 60% or more of its maximum capacity. FIG. 1 shows a graph which is an example of the error curve for a turbine meter tested with air at atmospheric pressure.

Designers and manufacturers of turbine meters have used various changes in meter component structure and different methods to attempt to flatten the low flow-rate hump in the accuracy curve. By way of example, the hump in the accuracy curve of turbine meters at low flow-rates has been adjusted by adjusting rotor blade tip clearance with respect to the body of the housing in which the rotor is mounted. Generally, if the accuracy registered at low flow-rates is significantly lower than the accuracy at high flow-rates, the tip clearance is decreased to bring the low flow-rate end of the accuracy curve up toward the high flow-rate end. If the accuracy registered at low flow-rates is significantly higher than the accuracy registered at high flow-rates, the tip clearance is increased to bring the accuracy of low flow-rates down to the level of that at higher flow-rates.

Other attempts have been made to adjust the accuracy of liquid turbine flow meters by providing such things as a meter housing having a bore with a conical axial cross section adjacent the location where turbine blades are rotating on the meter's rotor assembly. When attempting to apply these principles of accuracy adjustment to turbine meters, it is desirable to have the angle of the conical axial cross section of a meter as large as practicable. This enables the accuracy of a turbine meter to be adjusted as desired with relatively little adjustment of the position of the turbine blades. It was found, however, that turbine meters having conical axial cross sections with angles such as about 21 degrees had their accuracies at higher flow-rates drop off to a range of from about 97% to 98%. This is generally an unacceptable range of accuracies for turbine meters.

One of the objectives in testing and calibrating turbine meters in the natural gas industry is to require that turbine meters be tested at a pressure commensurate with their intended use. The reason that turbine meters are tested at a pressure commensurate with their intended use is due to the known sensitivity of turbine meters to pressure. As a result, the calibration of a turbine meter at its intended operating pressure results in more accurate measurements. Currently, air and natural gas are widely used for the purpose of testing and calibrating turbine meters for the natural gas industry.

It is difficult to attain the objective of testing turbine meters at their use pressures and rotating speeds because to do so requires the construction of high-pressure test facilities, which are very expensive to construct and costly to operate. In addition, there are a number of criteria that need to be fulfilled in order to have a proper certified facility that can test gas meter turbines. The criteria require that test facilities be available with acceptable flow rates, test pressures, accuracy and traceability characteristics to perform meaningful, metrologically-sound tests.

There are currently several governments throughout the world that are looking more seriously at high-pressure test requirements and are considering guidelines setting forth specific parameters with regard to testing and calibration. There are, however, only a limited number of facilities worldwide that can meet the high pressure requirements for testing turbine meters.

As of September 2001, the European Community has adopted EN 12261, a new standard for the testing and calibration of turbine meters. It requires that turbine meters intended for use above four bars (gauge) be calibrated at a pressure not less than half, and not more than twice the operating pressure. Meters intended for use below four bars can be calibrated at atmospheric pressure. This new standard replaces a hodgepodge of national and International Organization of Legal Metrology standards that had no consistency regarding test pressures for turbine meters. The new standard reflects the consensus in Europe that turbine meters are sensitive to changes in the density of the gas they are measuring. Hence, to obtain a calibration that will be valid at operating conditions it is important to replicate the operating conditions at the time of testing. The European Community has recognized that atmospheric test conditions do not produce a satisfactory calibration for meters intended for use at medium or high pressure by implementing these new standards. Similar requirements are expected to be developed in the United States and Canada.

In the United States, there are currently no national regulations affecting the calibration of gas meters. Some States set requirements for domestic gas meters, however, few if any affect transmission or other high pressure metering. Instead, recommended practices are set out in voluntary reports published by the American Gas Association (AGA). Currently, the AGA report on turbine gas meters, AGA Report No. 7: *The Measurement of Natural Gas and Turbine Meters* (AGA-7), is under review. One of the major thrusts of the revisions to AGA-7 is to recognize the density sensitivity of turbine meters. The Transmission Measurement Committee of the AGA is continuing to study the topic and changes to AGA-7 are expected to result in far higher demand for high pressure calibrations in the United States to improve the accuracy of the turbine meters sold and used there.

Similarly, the regulatory requirements in Canada allow high-pressure testing but do not require it. Currently, calibrations of turbine meters at atmospheric pressure with air is the norm, although some meters are supplied by their manufacturers with optional high-pressure test and calibration data at additional cost. A draft specification was issued by Measurement Canada for industry comment in April 2001 that dealt with high pressure testing. This draft was based on a precursor of EN 12261 and included the idea of a dividing line between high- and low-pressure meters at four bars.

One of the concerns in Canada is that there are not enough high pressure test facilities available. Because of the high pressures and high rotation speeds involved these facilities are expensive to build and can be dangerous to operate.

Based on the proposed changes in the guidelines and regulations discussed above, there is likely to be a marked increase in demand for the calibration of high pressure turbine meters. The current facilities available would not be able to handle the anticipated new demand of testing requirements. To continue to build facilities similar to the ones already in existence would continue to increase the cost of testing turbine meters as the facilities are costly to build, expensive to use and have long turn-around times for service.

For the forgoing reasons there is a need to provide an improved method and system for proving turbine meters that results in a more efficient and accurate calibration of turbine meters.

SUMMARY OF THE INVENTION

It is therefore an object of the present invention to provide a method and system to more efficiently and accurately test and calibrate turbine meters addressing at least some of the problems identified above.

According to an embodiment of the invention, there is provided a novel test medium which has characteristics which provide a higher Reynolds number at a given pressure than is the case with conventional test media and, because tests at higher Reynolds numbers provide more accurate results, results in an accurate test and calibration of a turbine meter at a lower pressure.

According to an embodiment of the invention, there is provided a test medium for proving a turbine meter. The test medium is a gas having the following characteristics:
   (a) Density>approximately 2×Density of Natural Gas;
   (b) Dynamic Viscosity approximately<Dynamic Viscosity of Natural Gas; and
   (c) Ideal gas behavior for approximately 15° C.<T<25° C. and approximately 1 bar<P<50 bar.

In a particular case, the test medium may also have the characteristic that it liquefies easily at a temperature>approximately −100° C. at atmospheric pressure. In another particular case, the test medium may further have the characteristic that it stores at room temperature in liquid form at approximately P<65 bar. In a further particular case, the test medium may be selected from a group consisting of carbon dioxide, argon and sulphur hexafluoride. The test medium is preferably carbon dioxide.

According to another embodiment of the invention, there is provided a method for proving a turbine meter including arranging a meter to be proved in a prover system and circulating a test medium through the prover system such that it passes through a reference meter and said meter to be proved, wherein the test medium is a gas having the following characteristics:
   (a) Density>approximately 2×Density of Natural Gas;
   (b) Dynamic Viscosity approximately<Dynamic Viscosity of Natural Gas; and
   (c) Ideal gas behavior for approximately 15° C.<T<25° C. and approximately 1 bar<P<50 bar.

In this embodiment, the test medium is preferably carbon dioxide and is preferably circulated through said prover system at a pressure of approximately 8 bar and a temperature of approximately 20° C.

In a particular case, the method may further include injecting liquefied test medium into said circulating test medium.

According to another embodiment of the invention, there is provided a system for proving a turbine meter including a test bench for mounting a meter to be proved, a reference meter, a test medium circulation system, arranged with said test bench and reference meter, for circulating a test media through said reference meter and a mounted meter to be proved, and a test medium for circulating through said test medium circulation system, said test medium comprising a gas having the following characteristics:
   (a) Density>approximately 2×Density of Natural Gas;
   (b) Dynamic Viscosity approximately<Dynamic Viscosity of Natural Gas; and
   (c) Ideal gas behavior for approximately 15° C.<T<25° C. and approximately 1 bar<P<50 bar.

In a particular case, the test medium circulation system may include a fill valve for inputting said test medium into said test medium circulation system, a compressor for pressurizing said test medium circulation system, a variable speed motor for driving said compressor and adjusting a pressure of said test medium circulation system, flow straighteners arranged in advance of each of said reference meter and said test bench, a pressure control valve, a system for cooling said test medium, and pipes for connecting all of the foregoing elements.

In a further particular case, the system for cooling said test medium includes one or more injection nozzles for injecting liquefied test medium into said test medium circulation system. Alternatively, the system for cooling said test medium includes a heat exchanger.

According to another embodiment of the invention, there is provided a method for cooling a test medium circulating in a turbine meter prover system including injecting liquefied test medium into said circulating test medium.

In a particular case, it is preferable that the test medium has the characteristic that its latent heat of vaporization>approximately 200 BTU/kg at 15° C.<T<25 and 1 bar<P<25 bar.

According to another embodiment of the invention, there is provided a system for cooling a test medium circulating in a turbine meter prover system including one or more injection nozzles provided to said prover system for injecting liquefied test medium into said test medium prover system.

Other aspects and features of the present invention will become apparent to those of ordinary skill in the art upon review of the following description of embodiments of the invention in conjunction with the accompanying figures.

BRIEF DESCRIPTION OF THE DRAWINGS

The embodiments of the present invention shall be more clearly understood with reference to the following description and to the drawings, in which.

DETAILED DESCRIPTION

Figure 1:
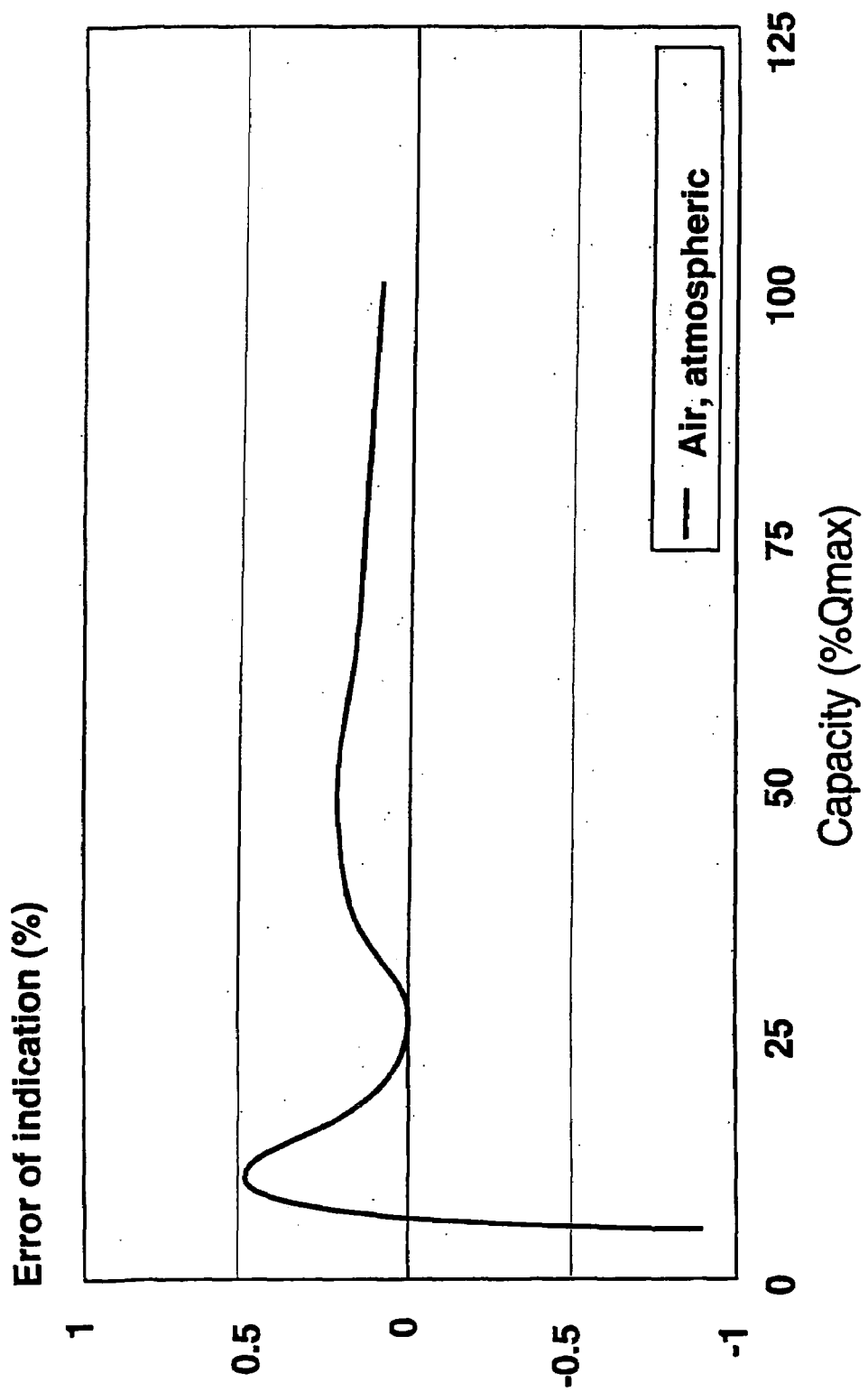
FIG. 1 is a graph that illustrates a relationship between turbine meter error and capacity for air at atmospheric pressure.

Currently, only air and natural gas are widely used for the purpose of proving turbine meters at both atmospheric pressure and at higher pressures. However, as described in the background, it can be very expensive to create an appropriate high-pressure test facility for testing turbine meters at the pressures at which they will be used.

Until now, the advantages of using an alternate gas, such as carbon dioxide, for the purpose of proving turbine meters instead of air or natural gas has not been recognized. The focus has been on modifying mechanical elements of the prover system or turbine meter itself. In particular, it has not been recognized that using a gas that has a higher Reynolds number at a given pressure than is the case with air or natural gas can provide an accurate test and calibration of a turbine meter at a lower pressure. As an example, the use of carbon dioxide results in Reynolds numbers that are roughly twice as large as those that result from air or natural gas at a given pressure, allowing testing and calibration to be performed accurately at lower pressures by using carbon dioxide as the test medium.

Thus, using a gas such as carbon dioxide instead of air or natural gas in a prover system will allow testing and calibration at a markedly decreased pressure. This will, in turn, decrease the attendant costs of building and operating a prover system compared to other systems which use air or natural gas as their test medium. The benefits in operation are expected to include lower set-up and operation costs for each test performed.

The following are theoretical results calculated from the fluid dynamic properties of carbon dioxide as compared to the conventional test mediums discussed above.

For gas flowing in a pipe, the Reynolds number $R_e$ of the flow is defined as:

$$R_e = \frac{\rho v D}{\eta} \quad (1)$$

where $\rho$=density of the gas, $v$=average velocity of the flow over a fixed cross section of the pipe, D=diameter of the pipe, and=dynamic viscosity of the gas.

The kinematic viscosity $\eta_k$ of a gas is defined as:

$$\eta_k = \frac{\eta}{\rho} \quad (2)$$

Therefore the Reynolds number can be rewritten as:

$$R_e = \frac{vD}{\eta_k} \quad (3)$$

Although the gas density $\rho$ is now taken out of the equation, it still exerts a major influence on the Reynolds number through the kinematic viscosity $\eta_k$ of the gas.

To compare the Reynolds number of a natural gas flow to that of a carbon dioxide flow, the Reynolds number may be expressed in the following ways, using equation (1).

For natural gas flowing in a pipe:

$$\rho_{(CH4)} = G_{(CH4)}\rho_{(air)} \quad (4)$$

$$R_{e(CH4)} = \frac{\rho_{(CH4)}vD}{\eta_{(CH4)}} = \frac{G_{(CH4)}\rho_{(air)}vD}{\eta_{(CH4)}}$$

where $\rho_{(CH4)}$ is the density of natural gas, $\rho_{(air)}$ is the density of air, $G_{(CH4)}$ is the specific gravity of natural gas, $v$ is the average velocity of the natural gas flow, and $\eta_{(CH4)}$ is the dynamic viscosity of natural gas.

For carbon dioxide flowing in the same pipe at the same velocity:

$$\rho_{(CO2)} = G_{(CO2)}\rho_{(air)} \quad (5)$$

$$R_{e(CO2)} = \frac{\rho_{(CO2)}vD}{\eta_{(CO2)}} = \frac{G_{(CO2)}\rho_{(air)}vD}{\eta_{(CO2)}}$$

where $\rho_{(CO2)}$ is the density of carbon dioxide, $G_{(CO2)}$ is the specific gravity of carbon dioxide, and $\eta_{(CO2)}$ is the dynamic viscosity of carbon dioxide.

The ratio of the Reynolds number of the carbon dioxide flow to that of the natural gas flow can then be compared:

$$\begin{aligned}\frac{R_{e(CO2)}}{R_{e(CH4)}} &= \frac{\frac{G_{(CO2)}\rho_{(air)}vD}{\eta_{(CO2)}}}{\frac{G_{(CH4)}\rho_{(air)}vD}{\eta_{(CH4)}}} \\ &= \frac{G_{(CO2)}\rho_{(air)}vD}{\eta_{(CO2)}} \times \frac{\eta_{(CH4)}}{G_{(CH4)}\rho_{(air)}vD} \\ &= \frac{G_{(CO2)}\eta_{(CH4)}}{\eta_{(CO2)}G_{(CH4)}} \\ &= \frac{1.52 \times 109}{1.50 \times 0.6} \\ &= 1.84 \end{aligned} \quad (6)$$

Equation (4) implies that a carbon dioxide stream flowing at the same velocity inside the same piece of pipe can achieve an 84% higher Reynolds number than that of a natural gas stream.

Applying the same analysis to an air stream:

$$\frac{R_{e(Air)}}{R_{e(CH4)}} = \frac{G_{(Air)}\eta_{(CH4)}}{\eta_{(Air)}G_{(CH4)}} = \frac{1.0 \times 109}{171 \times 0.6} = 1.06 \quad (7)$$

The ratio $R_{e(air)}/R_{e(CH4)}$ is found to be 1.06, indicating only a 6% difference in the Reynolds number for the air stream comparing to that of the natural gas stream.

Figure 2:
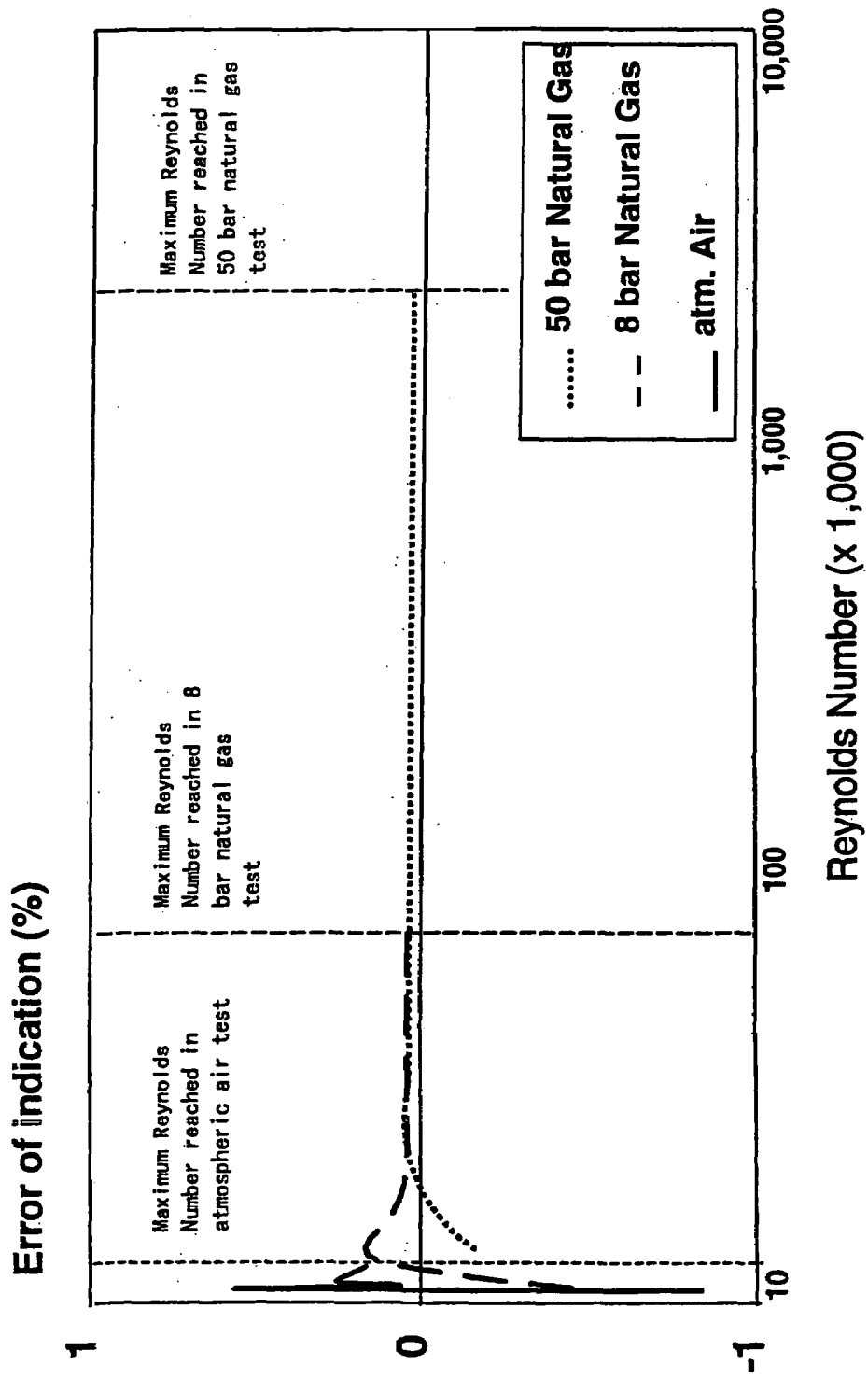
FIG. 2 is a graph that illustrates a relationship between meter error and Reynolds number for a variety of test mediums and pressures.

FIG. 2 shows a plot of meter error vs. Reynolds number for various test media and pressures. As illustrated in FIG. 2 an air stream flowing at $Q_{max}$ at atmospheric pressure cannot reach a high enough Reynolds number to reach the linear region of an error curve. It is also apparent from FIG. 2 that a way to obtain a more meaningful result is to push the error curve toward the linear region of the chart. In order to accomplish this, tests would have to be conducted at a higher Reynolds number, and thus a higher pressure.

From the above, it can be noted that if the turbine meters were initially proved using natural gas at atmospheric pressure and the variables in equation (1) above were re-examined, in order to boost the Reynolds number of the test flow to get a more meaningful error curve, one of the following would have to be done:
1. Increase the average velocity of the flow;
2. Increase the diameter of the pipe;
3. Increase the density of the gas; or
4. Use a gas with a lower dynamic viscosity.

It should be noted, however, that it is not possible to increase the maximum flow velocity in the above example since $Q_{max}$ has already been reached for the turbine meter. In addition, changing the pipe diameter is not an option because the turbine meter often defines the dimensions of the pipe. Therefore, one either needs to operate the test at a higher pressure (in order to increase the density of the gas), and/or replace the natural gas in the pipe with a gas that has a lower dynamic viscosity.

Assuming that a test pressure at 1 bar is maintained in the pipe but the natural gas content is replaced with carbon dioxide. At a test flow=$Q_{max}$ of the turbine meter, the error curve (initially the natural gas test curve at 1 bar, now carbon dioxide test curve at the same pressure) would be extended in the horizontal scale (Reynolds number scale) by 84% as predicted by equation (6), thereby reaching into a more linear region of the graph.

If the same Reynolds number is expected to produce the same meter error result, then this provides a way to test a higher pressure meter in a lower pressure carbon dioxide stream. Therefore, there is now an operating environment for the turbine meter in a carbon dioxide stream at atmospheric pressure similar to the operating environment of the same meter operating in natural gas at 1.84 times higher pressure. Thus, the carbon dioxide gas magnifies the "effective test pressure" by 84%.

If the pressure of the carbon dioxide test stream is raised to 10 bars, it can be theoretically demonstrated that the flow characteristics of the carbon dioxide test stream would now be similar to that of a natural gas stream operating at 10×1.84=18.4 bars. Applying the 0.5 p<test pressure <2.0 p rule (as set out in EN 12261), this would open up the possibility of testing a 35 bar (operating pressure) turbine meter in a 10 bar carbon dioxide flow.

As discussed above, gases other than carbon dioxide, may also be used in the proving of turbine meters according to an embodiment of the invention, for example, argon or sulphur hexafluoride may be considered. In particular, a test medium according to an embodiment of the invention is a gas having the following characteristics:

(a) Density>2×Density of Natural Gas;
(b) Dynamic Viscosity<Dynamic Viscosity of Natural Gas; and
(c) Ideal gas behavior for 15° C.<T<25° C. and 1 bar<P<50 bar.

Further, in order to ensure that a turbine meter prover system can be constructed and operated at reduced cost, it is preferrable if the test medium also satisfies the following properties:

(d) Liquefies easily at a temperature >−100° C. at atmospheric pressure; and
(e) Stores at room temperature in liquid form at P<65 bar.

Figure 3:
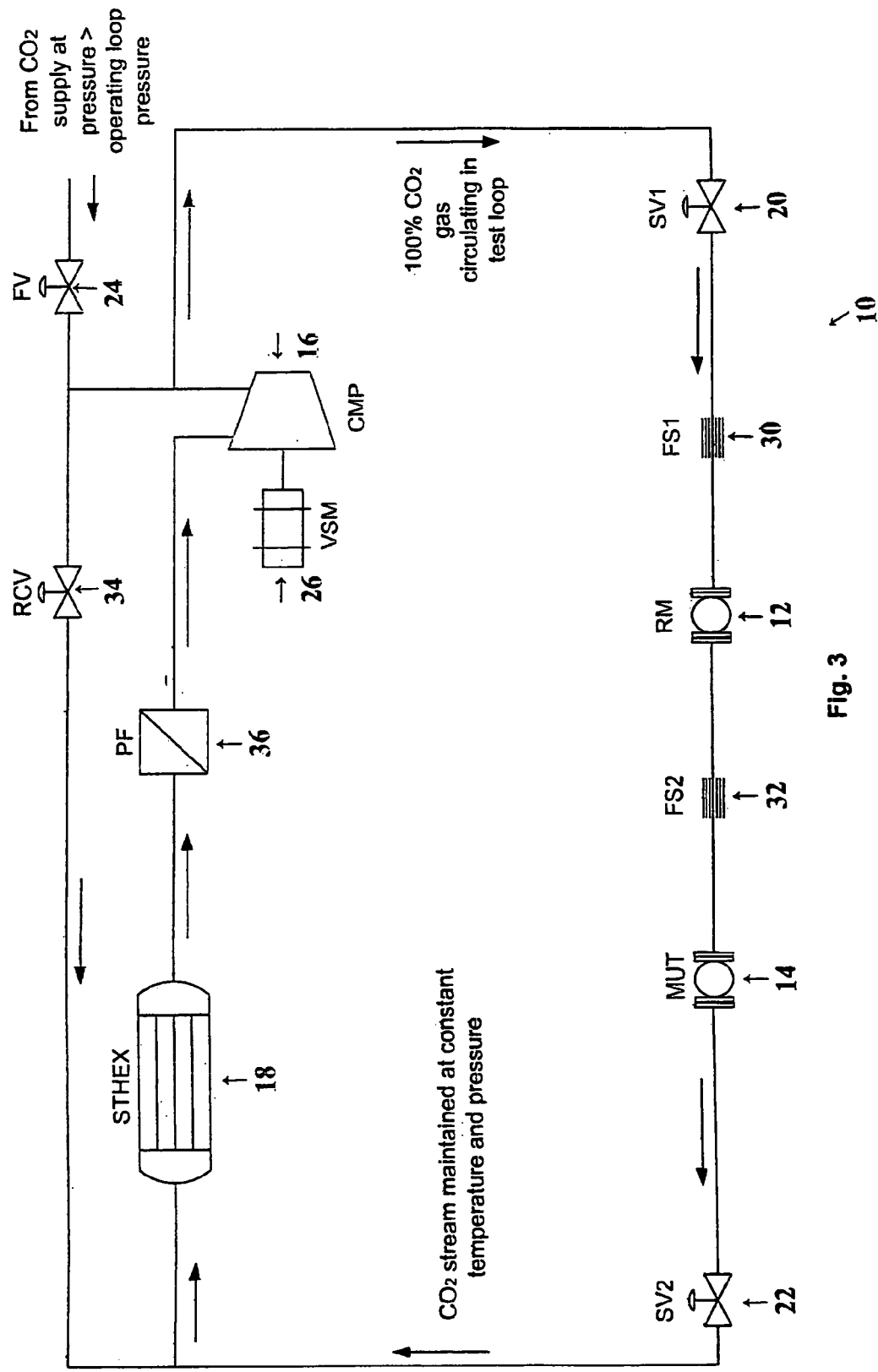
FIG. 3 illustrates a turbine meter proving system according to an embodiment of the invention.

FIG. 3 is an illustration of a turbine meter prover system according to an embodiment of the invention that can be used to test and calibrate turbine meters using a heavy gas such as carbon dioxide. The prover system 10 primarily includes a calibrated reference meter (RM) 12, a meter under test (MNUT) 14, a gas compressor (CMP) 16, a heat exchanger (such as a shell and tubes heat exchanger STHEX) 18. The prover system 10 also includes shut-off valves (SV1, SV2) 20, 22 which are mounted on either side of the MUT and other components as further discussed below.

During operation, the shut off valves (SV1, SV2) 20, 22 are opened and the system is charged with a test medium, such as carbon dioxide, from a storage tank (not shown) via a fill valve (FV) 24. After charging the prover system 10 with carbon dioxide to reach a target pressure, the fill valve (FV) 24 is then closed. A variable speed motor (VSM) 26 drives a compressor (CMP) 28 to pressurize and circulate the carbon dioxide in the prover system 10 which includes circulation through the reference meter and the meter under test RM, MUT, and their associated flow straighteners (FS1, FS2) 30,32. The pressure and flow rate of the circulating carbon dioxide stream is regulated by altering the speed of the variable speed motor (VSM) 26 and the opening of a re-circulation control valve (RCV) 34.

The system may also include a particle filter (PF) 36 to remove any dirt particles that may have been introduced in the gas stream by the meter under test (MUT) 14.

At the end of a test run, the accuracy of the meter under test (MUT) 14 is established by comparing the flow registered by it with the flow registered by the reference meter (RM) 12. To remove the meter under Test (MUT) 14, the prover system 10 is brought to atmospheric pressure by venting the prover system 10 and closing the shut-off valves (SV1, SV2) 20,22.

As described above, it is known that the calibration curve of a turbine meter shifts in both the positive and negative directions under pressure. This shift appears to occur at relatively modest pressure and then remains more stable as the pressure increases. This means that a gas customer buying gas metered over a turbine meter calibrated at atmospheric pressure may be paying more than they should. Conversely, if the error were negative, the gas supplier would be giving away free gas. Carbon dioxide can be used to replicate the density effect of gas at high pressure at a much lower actual pressure. The combination of the lower pressure required using carbon dioxide as a test medium and the higher density of the carbon dioxide molecule allows a prover system of a much less complex nature to be constructed and operated.

It will be understood by one of skill in the art that the phase change state, the liquid/gas phase line and the critical point of carbon dioxide may set the upper limits of the temperature and pressure environment within which carbon dioxide may be used as a test medium for turbine meters. The same would apply for any other gas of similar properties being used as a test medium to prove a turbine meter. In this embodiment, if the test environment is kept below carbon dioxide's critical point there should be no phase change concerns. Presently, it is anticipated that the testing of turbine meters used in the natural gas industry would be preferably conducted with carbon dioxide in a test environment where the temperature and pressure are approximately twenty degrees Celsius and eight bars, respectively.

Another issue to be considered in using carbon dioxide as a test medium relates to relaxation times. The issue as it relates to relaxation time is exhibited by carbon dioxide in very small (0.5 mm or less) sonic nozzles. In this case, relaxation time may result in small errors in determining mass flow because the stagnation temperature does not accurately track the throat temperature. This phenomenon may be corrected for mathematically, however, relaxation times generally impact on the accuracy of temperature measurement only in sonic flow. Due to the rate of flow that is typically employed in the test facilities, however, relaxation time of carbon dioxide is unlikely to be an issue in the prover system since flow rates should not approach the speed of sound Therefore, as long as the test medium in the prover system is kept below sonic flow, relaxation time should not be an issue.

Figure 4:
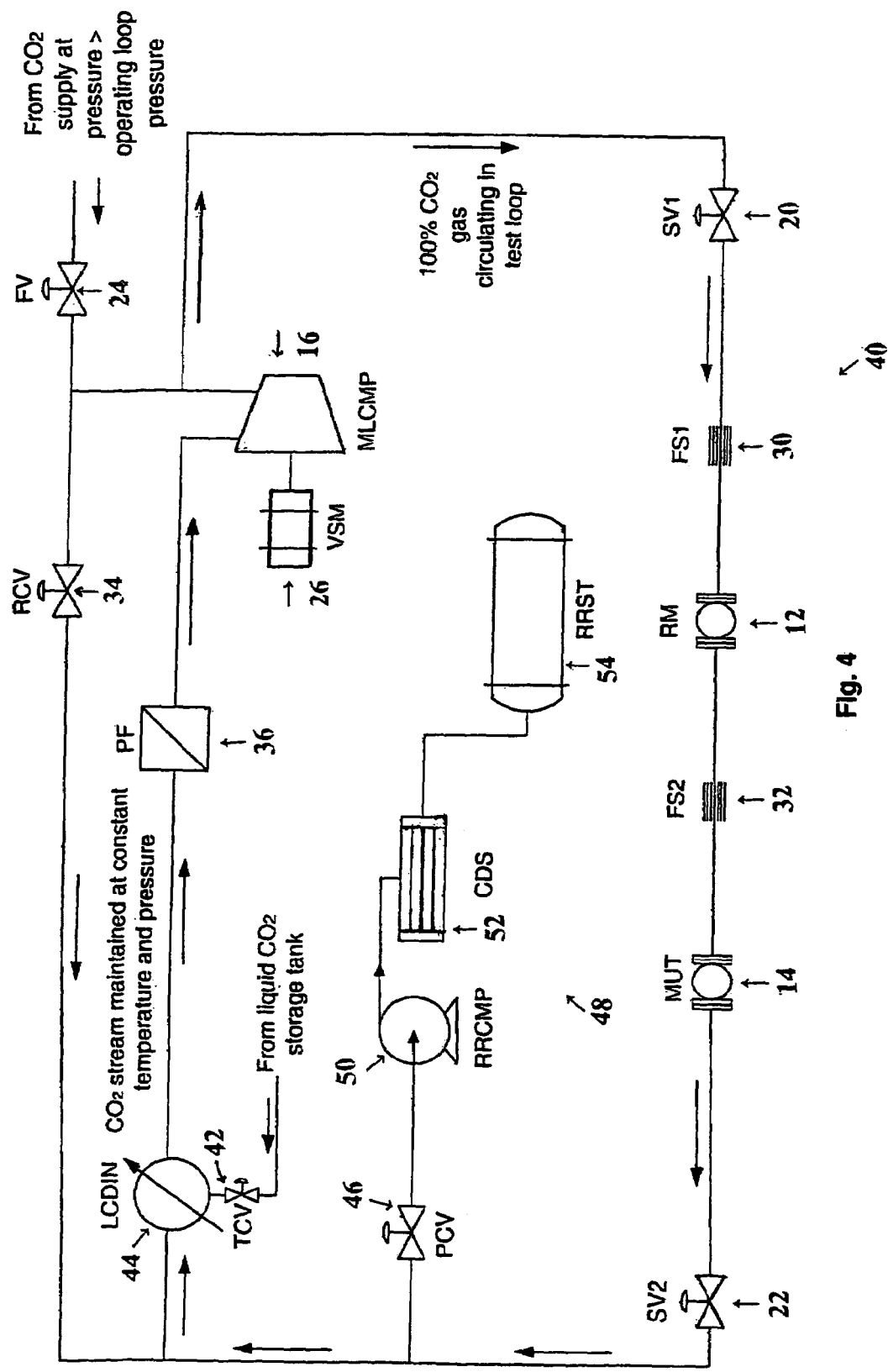
FIG. 4 illustrates a turbine meter proving system according to another embodiment of the invention, which includes an improved test medium cooling system.

FIG. 4 is an illustration of a turbine meter prover system 40 according to another embodiment of the invention. Elements in the present embodiment that are the same as those in the previous embodiment are given the same reference numbers. In this embodiment, the test medium is preferably carbon dioxide. As illustrated in FIG. 4, the temperature of the carbon dioxide stream in the prover system 40 may be controlled/maintained at an appropriate level by the introduction of liquid carbon dioxide into the prover system rather than by a heat exchanger. The liquid carbon dioxide can be introduced from a storage tank (not shown) via a temperature control valve (TCV) 42 and one or more liquid carbon dioxide injection nozzles (LCDIN) 44. The liquid carbon dioxide injection nozzles (LCDIN) 44 may conveniently be arranged in an array. The injected liquid carbon dioxide, which has a latent heat of vaporization of approximately 250 BTU/kg, enters the prover system 40 as a liquid and/or as dry ice particles and then quickly changes into the vapor phase due to heat transfer with the test medium, which results in the removal of some or all of the compression heat in the circulating test medium.

In this embodiment, the particle filter (PF) 36 may also remove any dry ice particles that remain following the cooling process.

In this embodiment, excess carbon dioxide gas may be withdrawn from the carbon dioxide stream via a pressure control valve (PCV) 46. The pressure control valve (PCV) 46 can be used to prevent over-pressurization of the system. In a particular case, the excess carbon dioxide removed through the pressure control valve (PCU) 46 may be sent to a recovery system 48 including a refrigerant recovery compressor (RRCMP) 50, a condenser (CDS) 52 and a storage tank (RRST) 54.

An advantage of the present embodiment is that the same gas that is used as the test medium, that is, carbon dioxide, can be used as a refrigerant to eliminate the need for a large and costly heat exchanger in the prover system 40. Another advantage is that the cooling of the test medium in the prover system 40 occurs more quickly than would be the case with a heat exchanger.

In the present embodiment, the gas used as a test medium is also used as a refrigerant for injection into the prover system to control the temperature of the test medium. Experiments have shown that this process will work when carbon dioxide is used as the test medium and refrigerant, however, theory also indicates that the present embodiment will function for various test media/refrigerants that preferably have the following characteristics:

Latent heat of vaporization>approximately 200 Btu/kg at 15° C.<T<25 and 1 bar<P<25 bar.

It will be understood by one of skill in the art that the refrigerant method and system of this embodiment may also be applied to conventional prover systems using, for example, air as the test medium.

According to another embodiment of the invention, an entrapment scheme (not shown) for the containment of any carbon dioxide released from the prover system may be provided, for example, at the re-circulation control valve (RCV) 34 or at other venting locations, to prevent release of carbon dioxide into the environment may be provided. This would allow for potential reuse of the carbon dioxide and would also alleviate any concerns by environmental groups of excess carbon dioxide being released into the environment.

A person skilled it the art will understand that any gas used as a test medium will preferably come from a pure source. As an example, carbon dioxide can be made through several processes, including from natural gas, however, the $CO_2$ which comes from natural gas can contain oily substances, which makes it unsuitable for the food and beverage industry and could also cause problems in a prover system. For this reason, it is important to be cognizant of the source of the gas that is being used and any significant by-products that may result from its production or its use that may be adverse to its use in testing and calibration of turbine meters.

It will be further understood that the invention is not limited to the embodiments described herein which are merely illustrative of preferred embodiments of carrying out the invention, and which are susceptible to modification of form, arrangement of parts, steps, details and order of operation. The invention, rather, is intended to encompass all such modification within its scope, as defined by the claims.

What is claimed is:

1. A method for proving a turbine meter for use in a natural gas conduit, the method comprising:
providing a prover system, the prover system including a reference meter;
connecting the turbine meter to the prover system for fluid communication therewith;
introducing a test medium into the prover system, the test medium being a gas other than air having a Reynolds number greater than the Reynolds number of natural gas at a given pressure;
urging the test medium to flow through the reference meter and the turbine meter;
measuring the flow rate of the test medium through the prover system using each of the reference meter and the turbine meter; and
comparing the flow rate measured by the reference meter to the flow rate measured by the turbine meter to establish thereby the accuracy of the turbine meter.

2. The method of claim 1 wherein introducing a test medium into the prover system includes charging the prover system with the test medium until a predetermined target pressure has been reached.

3. The method of claim 2 wherein introducing a test medium into the prover system further includes pressurizing the test medium in the prover system.

4. The method of claim 1 wherein the test medium has a density that is greater than twice the density of natural gas at a given pressure.

5. The method of claim 1 wherein the test medium has a dynamic viscosity that is lesser than the dynamic viscosity of natural gas at a given pressure.

6. The method of claim 1 wherein the test medium exhibits ideal gas behavior at a temperature approximately 150° C.<T<250° C. and at a pressure approximately 1 bar<P<50 bar.

7. The method of claim 1 wherein the test medium liquifies easily at a temperature greater than approximately −100° C. at atmospheric pressure.

8. The method of claim 1 wherein the test medium stores at room temperature in liquid form at a pressure smaller than 65 bar.

9. The method of claim 1 wherein the test medium is carbon dioxide.

10. The method of claim 1 wherein the test medium is selected from the group consisting of carbon dioxide, argon and sulphur hexafluoride.

11. The method of claim 1 wherein urging the test medium to flow through the reference meter and the turbine meter includes circulating the test medium through the prover system at a pressure of approximately 8 bar and a temperature of approximately 20° C.

12. The method of claim 1 further including controlling the temperature of the test medium circulating in the prover system.

13. The method of claim 12 wherein controlling the temperature of the test medium circulating in the prover system includes cooling the test medium using a heat exchanger.

14. The method of claim 12 wherein controlling the temperature of the test medium circulating in the prover system includes introducing a refrigerant into the prover system.

15. The method of claim 14 wherein the refrigerant introduced into the prover system is liquefied test medium.

16. The method of claim 14 wherein the refrigerant introduced into the prover system is liquefied carbon dioxide.

17. The method of claim 14 wherein the refrigerant introduced into the prover system has a latent heat of vaporization that is greater than approximately 200 Btu/kg at a temperature 150° C.<T <25 and at a pressure 1 bar<P<25 bar.

18. A system for proving a turbine meter for use in a natural gas conduit, the system comprising:
a reference meter;
a conduit system for carrying a test medium to be used for proving the turbine meter, the conduit system connecting the reference meter to the turbine meter for fluid communication therebetween;
a test medium, the test medium being a gas other than air having a Reynolds number greater than the Reynolds number of natural gas at a given pressure; and
means for circulating the test medium in the conduit system and through the reference meter and the turbine meter.

19. The system of claim 18 wherein the conduit system includes a fill valve for introducing the test medium into the system.

20. The system of claim 19 wherein the conduit system further includes:
a first flow straightener disposed upstream from the reference meter; and
a second flow straightener disposed upstream from the turbine meter.

21. The system of claim 18 wherein the test medium has a density that is greater than twice the density of natural gas at a given pressure.

22. The system of claim 18 wherein the test medium has a dynamic viscosity that is lesser than the dynamic viscosity of natural gas at a given pressure.

23. The system of claim 18 wherein the test medium exhibits ideal gas behavior at a temperature approximately 15° C.<T<25° C. and at a pressure approximately 1 bar<P<50 bar.

24. The system of claim 18 wherein the test medium liquifies easily at a temperature greater than approximately −100° C. at atmospheric pressure.

25. The system of claim ~wherein the test medium stores at room temperature in liquid form at a pressure smaller than 65 bar.

26. The system of claim 18 wherein the test medium is carbon dioxide.

27. The system of claim 18 wherein the test medium is selected from the group consisting of carbon dioxide, argon and sulphur hexafluoride.

28. The system of claim 18 wherein the test medium is selected from the group consisting of carbon dioxide, argon and sulphur hexafluoride.

29. The system of claim 18 wherein the means for circulating the test medium includes:
a compressor for pressurizing the conduit system and circulating the test medium; and
means for driving the compressor.

30. The system of claim 29 wherein the means for driving the compressor includes a variable speed motor.

31. The system of claim 29 wherein the means for driving the compressor includes a variable speed motor.

32. The system of claim 18 further including means for cooling the test medium.

33. The system of claim 32 wherein the means for cooling the test medium includes a heat exchanger operatively connected to the conduit system.

34. The system of claim 33 wherein the means for cooling the test medium includes a heat exchanger operatively connected to the conduit system.

35. The system of claim 33 wherein the means for cooling the test medium includes at least one injection nozzle for delivering a refrigerant into the conduit system.

36. The system of claim 35 further including a refrigerant for cooling the test medium.

37. The system of claim 36 wherein the refrigerant is liquified carbon dioxide.

* * * * *

UNITED STATES PATENT AND TRADEMARK OFFICE
CERTIFICATE OF CORRECTION

PATENT NO. : 7,155,956 B2
APPLICATION NO. : 10/762549
DATED : January 2, 2007
INVENTOR(S) : Paul W. Tang It is certified that error appears in the above-identified patent and that said Letters Patent is hereby corrected as shown below:

Column 7, line 21: Replace "number $R_c$" with -- number $R_e$ --.

Column 8, line 40: Replace "ratio $R_{e(air)}/R_{c(CH4)}$" with -- ratio $R_{e(air)}/R_{e(CH4)}$ --.

Column 11, line 42: Replace "15°C.<T<25" with --15°C.<T<25°C.--.

Column 11, line 57: Replace "a person skilled it the art" with --a person skilled in the art--.

Column 13, line 13
Claim 17, line 13: Replace "150°C.<T<25" with --15°C.<T<25°C.--.

Signed and Sealed this

Tenth Day of April, 2007

JON W. DUDAS
*Director of the United States Patent and Trademark Office*